(12) United States Patent
Miyazaki

(10) Patent No.: US 10,414,882 B2
(45) Date of Patent: Sep. 17, 2019

(54) METHOD FOR PRODUCING MASTERBATCH

(71) Applicant: SUMITOMO RUBBER INDUSTRIES, LTD., Kobe-shi, Hyogo (JP)

(72) Inventor: Sumiko Miyazaki, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 15 days.

(21) Appl. No.: 15/787,160

(22) Filed: Oct. 18, 2017

(65) Prior Publication Data

US 2018/0118898 A1    May 3, 2018

(30) Foreign Application Priority Data

Nov. 1, 2016    (JP) ................. 2016-214349

(51) Int. Cl.
  *C08J 3/22* (2006.01)
  *C08K 3/013* (2018.01)
  *B60C 1/00* (2006.01)
  *C08J 5/04* (2006.01)
  *C08L 9/00* (2006.01)
  *C08J 3/20* (2006.01)
  *C08J 5/02* (2006.01)
  *C08L 21/02* (2006.01)

(52) U.S. Cl.
  CPC ............. *C08J 3/226* (2013.01); *B60C 1/00* (2013.01); *C08J 3/203* (2013.01); *C08J 3/22* (2013.01); *C08J 5/02* (2013.01); *C08J 5/045* (2013.01); *C08K 3/013* (2018.01); *C08L 9/00* (2013.01); *C08L 21/02* (2013.01); *C08J 2307/02* (2013.01)

(58) Field of Classification Search
  CPC ..... C08J 3/203; C08J 3/22; C08J 3/226; C08J 5/02; C08J 5/045; C08K 3/013; C08L 9/00; C08L 21/02
  See application file for complete search history.

(56) References Cited

U.S. PATENT DOCUMENTS

2018/0079874 A1* 3/2018 Lallet ................. C08J 3/215

FOREIGN PATENT DOCUMENTS

| JP | 62-104871 A | 5/1987 |
| JP | 2004-99625 A | 4/2004 |
| JP | 2006-348216 A | 12/2006 |
| JP | 2010-209175 A | 9/2010 |
| JP | 2014-141637 A | 8/2014 |
| JP | 2015-93882 A | 5/2015 |

* cited by examiner

*Primary Examiner* — Edward J Cain
(74) *Attorney, Agent, or Firm* — Birch, Stewart, Kolasch & Birch, LLP

(57) ABSTRACT

The present invention provides a method for producing a masterbatch and related products which enhance the dispersibility of fillers in rubber to improve the balance of tensile strength, rigidity, and fuel economy. Provided is a method for producing a masterbatch, including a step of mixing a rubber latex having a zeta potential of −100 to −20 mV with a filler dispersion having a zeta potential of 10 to 90 mV, and preparing a latex compound having a zeta potential of −20 to 0 mV.

6 Claims, No Drawings

METHOD FOR PRODUCING MASTERBATCH

TECHNICAL FIELD

The present invention relates to a method for producing a masterbatch.

BACKGROUND ART

It has been conventionally known that fillers, for example, short fibers such as aramid, microfibrillated plant fibers such as cellulose fibers, or crystalline polymers such as syndiotactic polybutadiene can be incorporated into rubber compositions to reinforce the rubber compositions to improve the modulus (complex modulus). However, fillers are highly self-aggregative and poorly compatible with rubber components in many cases. For example, when microfibrillated plant fibers are introduced into and mixed with rubber latex, unfortunately, about 20% of the microfibrillated plant fibers are not incorporated into the rubber component but remain in the solution.

In masterbatches prepared by mixing rubber latex with fillers, the fillers tend to easily form aggregates. For example, tires formed from such masterbatches may suffer rapid wear, cracks, chipping, or separation between layers due to the formed aggregates, thereby possibly resulting in air leakage or loss of handling stability. Therefore, there is a need to enhance the dispersibility of fillers in rubber in masterbatches.

In order to enhance the dispersibility of fillers in rubber in masterbatches to improve rubber physical properties, conventional methods for preparing a masterbatch include mixing rubber latex with fillers and adjusting the pH of the mixture. Other methods are disclosed, including, for example: methods of mixing a carbon black-containing slurry solution having a predetermined zeta potential with a rubber latex solution followed by coagulation and drying to produce a wet masterbatch (see, for example, Patent Literature 1); methods of breaking the amide bonds in natural rubber latex and mixing the resulting latex with a slurry solution of inorganic filler to produce a natural rubber masterbatch (see, for example, Patent Literature 2); methods of mixing a slurry of inorganic particles with a polymer latex having a surface potential of a sign opposite to that of the slurry of inorganic particles to produce a polymer composite (see, for example, Patent Literature 3); methods of mixing together aqueous dispersions of single components in which the particles have a surface charge of the same sign and a predetermined zeta potential, and the ratio between the zeta potentials of the particles of each dispersion is within a predetermined range, followed by coagulating the mixed dispersion thus obtained (see, for example, Patent Literature 4); methods of removing water from an aqueous dispersion which contains rubber latex and a cellulose nanofiber having a predetermined average fiber width, and has a predetermined solids concentration to produce a rubber masterbatch (see, for example, Patent Literature 5); and methods of removing water from a mixture which contains a resin emulsion and a fine cellulose fiber having a predetermined average fiber width, and has a predetermined solids concentration to produce a composite (see, for example, Patent Literature 6).

CITATION LIST

Patent Literature

Patent Literature 1: JP 2010-209175 A
Patent Literature 2: JP 2004-99625 A
Patent Literature 3: JP 2006-348216 A
Patent Literature 4: JP S62-104871 A
Patent Literature 5: JP 2014-141637 A
Patent Literature 6: JP 2015-93882 A

SUMMARY OF INVENTION

Technical Problem

As described above, various methods have been studied to enhance the dispersibility of fillers in rubber in masterbatches to improve rubber physical properties. However, there is still room for improvement in terms of dispersibility of fillers.

The present invention aims to solve the above problems and provide a method for producing a masterbatch and related products which enhance the dispersibility of fillers in rubber to improve the balance of tensile strength, rigidity, and fuel economy.

Solution to Problem

The present invention relates to a method for producing a masterbatch, including a step of mixing a rubber latex having a zeta potential of −100 to −20 mV with a filler dispersion having a zeta potential of 10 to 90 mV, and preparing a latex compound having a zeta potential of −20 to 0 mV.

The filler is preferably a microfibrillated natural fiber.
The rubber latex is preferably a diene rubber latex.
Another aspect of the present invention is a masterbatch, produced by the method.
Another aspect of the present invention is a rubber composition for tires, produced from the masterbatch.
Another aspect of the present invention is a pneumatic tire, formed from the rubber composition.

Advantageous Effects of Invention

The method for producing a masterbatch of the present invention includes a step of mixing a rubber latex having a zeta potential of −100 to −20 mV with a filler dispersion having a zeta potential of 10 to 90 mV, and preparing a latex compound having a zeta potential of −20 to 0 mV. Such a method further enhances the dispersibility of fillers in rubber so that masterbatches in which fillers are finely dispersed in rubber can be provided. Such masterbatches can be used to produce rubber compositions for tires and pneumatic tires having an improved balance of tensile strength, rigidity, and fuel economy.

DESCRIPTION OF EMBODIMENTS

[Method for Producing Masterbatch]

The method for producing a masterbatch of the present invention includes a step of mixing a rubber latex having a zeta potential of −100 to −20 mV with a filler dispersion having a zeta potential of 10 to 90 mV, and preparing a latex compound having a zeta potential of −20 to 0 mV. The production method of the present invention may include other steps as long as it includes the above step. The above step may be performed once or repeated multiple times.

It is usually difficult to homogeneously disperse fillers in rubber in masterbatches. However, the present inventor has found that by the production method including the above step in which a latex compound having a predetermined zeta potential of −20 to 0 mV is prepared, it is possible to reduce aggregation of fillers to finely and highly disperse the fillers in rubber, and that a masterbatch produced by such a method can be used to improve the balance of tensile strength, rigidity, and fuel economy.

In the present invention, a step is performed of mixing a rubber latex having a zeta potential of −100 to −20 mV with a filler dispersion having a zeta potential of 10 to 90 mV, and preparing a latex compound having a zeta potential of −20 to 0 mV.

Any rubber latex having a zeta potential within a range of −100 to −20 mV may be used. Suitable examples include diene rubber latexes such as natural rubber latex, modified natural rubber latexes (saponified natural rubber latex, epoxidized natural rubber latex, etc.), and synthetic diene rubber latexes (latexes of polybutadiene rubber (BR), styrene butadiene rubber (SBR), styrene isoprene butadiene rubber (SIBR), polyisoprene rubber, acrylonitrile butadiene rubber, ethylene vinyl acetate rubber, chloroprene rubber, vinyl pyridine rubber, butyl rubber, etc.). Thus, in another suitable embodiment of the present invention, the rubber latex is a diene rubber latex. These rubber latexes may be used alone, or two or more of these may be used in combination. To more suitably achieve the effects of the present invention, natural rubber latex, SBR latex, BR latex, and polyisoprene rubber latex are more preferred among these, with natural rubber latex being particularly preferred.

The zeta potential of the rubber latex can be adjusted by varying the concentration (rubber solids concentration).

To more suitably achieve the effects of the present invention, the rubber latex preferably has a zeta potential of −90 mV or higher, more preferably −80 mV or higher, particularly preferably −70 mV or higher, but preferably −30 mV or lower, more preferably −40 mV or lower, still more preferably −50 mV or lower, particularly preferably −60 mV or lower.

Herein, the zeta potential can be measured using the device under the conditions described later in EXAMPLES.

Natural rubber latex, which is collected as sap of natural rubber trees such as hevea trees, contains components including water, proteins, lipids, and inorganic salts as well as a rubber component. The gel fraction of the rubber is considered to be derived from a complex of various impurities therein. In the present invention, the natural rubber latex may be raw latex (field latex) taken from hevea trees by tapping, or concentrated latex prepared by concentration via centrifugation or creaming (e.g., purified latex, high ammonia latex prepared by adding ammonia in a conventional manner, or LATZ latex which has been stabilized with zinc oxide, TMTD, and ammonia).

Natural rubber latex contains honeycomb cells formed of proteins and phospholipids, and the cells tend to inhibit the incorporation of fillers into the natural rubber. For this reason, it is necessary to perform a treatment, such as previously removing the cells in natural rubber latex by saponification, before mixing natural rubber latex with fillers. However, the production method of the present invention including the above step, particularly preparing a latex compound having a predetermined zeta potential of −20 to 0 mV, allows fillers to be finely dispersed in rubber, even in unsaponified natural rubber latex.

The rubber latex can be prepared by conventionally known methods, or it may be any commercial product. The rubber latex preferably has a rubber solids content (solids concentration) of 5% to 80% by mass. The solids concentration is more preferably 7% by mass or more, still more preferably 10% by mass or more. In view of dispersibility of fillers, it is also more preferably 70% by mass or less, still more preferably 60% by mass or less, particularly preferably 20% by mass or less.

The filler dispersion is prepared by dispersing a filler in a solvent. Any filler dispersion having a zeta potential within a range of 10 to 90 mV can be used. Suitable examples of the filler include silica, lignin, waste paper, walnuts, and microfibrillated natural fibers. These fillers may be used alone, or two or more of these may be used in combination. To more suitably achieve the effects of the present invention, microfibrillated natural fibers are particularly preferred among these. Usually, water is suitably used as the solvent. Examples of the solvent other than water include water-soluble alcohols, ethers, and ketones.

The zeta potential of the filler dispersion can be adjusted by varying the filler concentration (filler solids concentration) or the type of solvent.

To more suitably achieve the effects of the present invention, the zeta potential of the filler dispersion is preferably 15 mV or higher, more preferably 20 mV or higher, still more preferably 25 mV or higher, but is preferably 80 mV or lower, more preferably 70 mV or lower, still more preferably 50 mV or lower, particularly preferably 40 mV or lower.

Any microfibrillated natural fiber derived from naturally-occurring materials may be used. Examples include cellulose microfibrils derived from, for example: resource biomass such as fruits, grains, and root vegetables; wood, bamboo, hemp, jute, and kenaf, and pulp or paper and cloth produced therefrom; waste biomass such as agricultural waste, food waste, and sewage sludge; unused biomass such as rice straw, wheat straw, and thinnings; and celluloses produced by ascidians, acetic acid bacteria, or other organisms, and chitin nanofibers derived from crustaceans such as crabs and shrimps, insects, fungi, and other organisms.

The microfibrillated natural fiber may be produced by any method. For example, the cellulose microfibril may be produced by chemically treating the raw material of the cellulose microfibril with sodium hydroxide or other chemicals, followed by mechanically grinding or beating using a refiner, a twin screw kneader (twin screw extruder), a twin screw kneading extruder, a high-pressure homogenizer, a media-agitating mill, a stone mill, a grinder, a vibration mill, a sand grinder, or other devices. With this method, a substantially lignin-free cellulose microfibril can be produced because lignin is separated from the raw material by the chemical treatment. Other methods include ultra-high pressure treatment of the raw material of the microfibrillated natural fiber.

The microfibrillated natural fiber may also be produced by performing the above method followed by a treatment such as oxidation or various chemical modifications.

In view of tensile strength, the microfibrillated natural fiber preferably has an average fiber diameter of 1 μm or less, more preferably 0.5 μm or less, still more preferably 200 nm or less, further preferably 100 nm or less, particularly preferably 80 nm or less, most preferably 50 nm or less. The lower limit of the average fiber diameter is not particularly limited. In view of workability, the average fiber diameter is preferably 3 nm or more, more preferably 5 nm or more, still more preferably 10 nm or more.

In view of tensile strength, the microfibrillated natural fiber preferably has an average fiber length of 5 mm or less, more preferably 1 mm or less, still more preferably 100 μm or less, further preferably 10 μm or less, particularly preferably 1 μm or less. In view of workability, the average fiber length is preferably 0.01 μm or more, more preferably 0.1 μm or more, still more preferably 0.5 μm or more.

The average fiber diameter and average fiber length of the microfibrillated natural fiber can be measured by, for example, image analysis of scanning electron micrographs, image analysis of transmission micrographs, X-ray scattering data analysis, or an aperture impedance method (Coulter principle).

The filler dispersion can be prepared by any method including known methods. For example, it may be prepared by dispersing the filler in the solvent using a high-speed homogenizer, ultrasonic homogenizer, colloid mill, blender mill, or other devices. The temperature and time during the preparation may be appropriately selected within usual ranges so that the filler can be sufficiently dispersed in the solvent.

The amount (solids content, solids concentration) of the filler in the filler dispersion is not particularly limited. In view of the dispersibility of the filler in the dispersion, the amount of the filler based on 100% by mass of the filler dispersion is preferably 0.2% to 20% by mass, more preferably 0.3% to 10% by mass, still more preferably 0.4% to 3% by mass, particularly preferably 0.5% to 1% by mass.

In the above step, the mixing of the rubber latex with the filler dispersion is not particularly limited as long as the rubber latex is mixed with the filler dispersion. Other compounding agents, such as a binder, may be added to the rubber latex and the filler dispersion.

In the above step, the rubber latex may be mixed with the filler dispersion by any method. Examples include: a method in which the rubber latex is placed and stirred in a known stirring device such as a high-speed homogenizer, ultrasonic homogenizer, colloid mill, or blender mill while dropwise adding the filler dispersion; a method in which the filler dispersion is placed and stirred in such a known stirring device while dropwise adding the rubber latex; and a method in which the rubber latex and the filler dispersion are placed, stirred, and mixed in such a known stirring device. As a result, a rubber latex dispersion is obtained.

In the above step, the rubber latex is preferably mixed with the filler dispersion such that the amount of the filler is 5 to 150 parts by mass per 100 parts by mass of the rubber solids in the rubber latex. When the amount is 5 parts by mass or more, the effects of the present invention can be more suitably achieved. When it is 150 parts by mass or less, the dispersibility of the filler in rubber can be further enhanced so that the effects of the present invention can be more suitably achieved. The amount of the filler is more preferably 10 parts by mass or more, still more preferably 15 parts by mass or more, but is more preferably 100 parts by mass or less, still more preferably 70 parts by mass or less, further preferably 50 parts by mass or less, particularly preferably 30 parts by mass or less.

In the above step, in order to obtain a homogeneous rubber latex dispersion, the temperature and time for mixing of the rubber latex with the filler dispersion are preferably 10° C. to 40° C. for 3 to 120 minutes, more preferably 15° C. to 35° C. for 5 to 90 minutes.

In the above step, a latex compound having a zeta potential of −20 to 0 mV is prepared from the rubber latex dispersion. By preparing a latex compound having a zeta potential of −20 to 0 mV, it is possible to reduce aggregation of the filler to finely and highly disperse the filler in rubber. The zeta potential is preferably −2 mV or lower, more preferably −5 mV or lower, still more preferably −10 mV or lower.

In the present invention which includes mixing the rubber latex with the filler dispersion and preparing a latex compound having a zeta potential of −20 to 0 mV, a coagulation reaction of the latex compound naturally proceeds simultaneously with the process of preparing the latex compound. Herein, the expression "a latex compound having a zeta potential of −20 to 0 mV is prepared in the above step" means that the latex compound has a zeta potential within a range of −20 to 0 mV after a time period long enough to substantially allow the coagulation reaction which proceeds simultaneously with the process of preparing the latex compound to sufficiently proceed and complete.

The above step includes mixing the rubber latex with the filler dispersion and preparing a latex compound having a zeta potential of −20 to 0 mV. The preparation may be carried out by any method, preferably by placing and stirring in a stirring device a rubber latex dispersion obtained by mixing the rubber latex with the filler dispersion, while adding an anionic polymer flocculant, or an acid and/or a salt, particularly preferably an acid, as needed. Moreover, in view of dispersibility of fillers, the acid and/or salt, if used, are/is preferably added stepwise, i.e., introduced stepwise (in portions of the total amount). In a particularly preferred embodiment, an acid is introduced stepwise.

The necessity of the addition of the anionic polymer flocculant, or the acid and/or salt, and the amount thereof may be determined while continuously or intermittently measuring the zeta potential of the rubber latex dispersion.

Examples of the acid include formic acid, sulfuric acid, hydrochloric acid, and acetic acid. Examples of the salt include monovalent to trivalent metal salts such as sodium chloride, magnesium chloride, and calcium salts (calcium nitrate, calcium chloride, etc.). Calcium chloride is preferred among these.

Usually, the zeta potential of the latex compound can be increased by adding an acid or a salt, for example, an acid such as formic acid, sulfuric acid, hydrochloric acid, or acetic acid, or a monovalent to trivalent metal salt such as sodium chloride, magnesium chloride, or calcium salts (calcium nitrate, calcium chloride, etc.). Conversely, the zeta potential of the latex compound can be decreased by adding an anionic polymer flocculant such as an acrylate polymer, or the like.

Examples of the stirring device include known stirring devices such as high-speed homogenizers, ultrasonic homogenizers, colloid mills, blender mills, and electronically controlled stirring devices. In view of dispersibility of fillers, it is preferred to use an electronically controlled stirring device. The conditions during the stirring may be appropriately selected within a usual range. In view of dispersibility of fillers, for example, the stirring speed is preferably 10 to 500 rpm, more preferably 50 to 200 rpm. The temperature and time for stirring are preferably 10° C. to 40° C. for 3 to 120 minutes, more preferably 15° C. to 35° C. for 5 to 90 minutes.

In preparing a latex compound having a zeta potential of −20 to 0 mV, the temperature of the latex compound is preferably 10° C. to 40° C. in view of dispersibility of fillers. It is more preferably 35° C. or lower.

Also, in the step of mixing the rubber latex with the filler dispersion and preparing a latex compound having a zeta potential of −20 to 0 mV, a flocculant may be added to control the simultaneous coagulation (the size of coagulated particle aggregate). Examples of the flocculant include cationic polymers.

A coagulum is formed through the above step. The coagulum (containing the coagulated rubber and the filler) formed in the above step may be filtered and dried by known methods as needed, followed by rubber kneading using a two-roll mill, Banbury mixer, or other kneading machines to obtain a masterbatch in which the filler is finely and highly dispersed in the rubber matrix. The masterbatch may contain other components as long as the effects of the present invention are not hindered.

[Masterbatch]

The method for producing a masterbatch of the present invention includes a step of mixing a rubber latex having a zeta potential of −100 to −20 mV with a filler dispersion having a zeta potential of 10 to 90 mV, and preparing a latex compound having a zeta potential of −20 to 0 mV. Such a method further enhances the dispersibility of fillers in rubber so that masterbatches in which fillers are finely dispersed in rubber can be provided. Accordingly, the masterbatch produced by the production method of the present invention is characterized in that fillers are finely dispersed in rubber. Thus, another aspect of the present invention is a masterbatch produced by the production method.

[Rubber Composition for Tires]

The rubber composition for tires of the present invention is produced from the masterbatch. Since the filler is finely dispersed in the rubber in the masterbatch, the fine dispersion of the filler can still be achieved in the rubber composition combining the masterbatch with other components. Consequently, the balance of tensile strength, rigidity, and fuel economy can be improved.

In the rubber composition for tires of the present invention, the amount of the rubber derived from the masterbatch is preferably 5% by mass or more, more preferably 10% by mass or more, still more preferably 15% by mass or more, based on 100% by mass of the rubber component in the rubber composition. When it is 5% by mass or more, the effects of the present invention can be more suitably achieved. The upper limit of the amount may be 100% by mass.

As described above, the rubber composition for tires of the present invention may contain an additional rubber which is not derived from the masterbatch. Non-limiting examples of the additional rubber include natural rubber (NR), polybutadiene rubber (BR), styrene butadiene rubber (SBR), ethylene propylene diene rubber (EPDM), chloroprene rubber (CR), acrylonitrile butadiene rubber (NBR), and butyl rubber (IIR). Among these, NR, BR, and SBR are preferred, with NR and/or BR being more preferred. Particularly preferred is a combination of NR and BR.

Non-limiting examples of the natural rubber (NR) include those commonly used in the rubber industry, such as SIR20, RSS#3, and TSR20.

In cases where the rubber composition for tires of the present invention contains natural rubber as an additional rubber which is not derived from the masterbatch, the amount of natural rubber based on 100% by mass of the rubber component in the rubber composition for tires of the present invention is preferably 5% by mass or more, more preferably 10% by mass or more, still more preferably 20% by mass or more. When it is 5% by mass or more, particularly excellent fuel economy can be obtained. The amount of natural rubber is also preferably 60% by mass or less, more preferably 50% by mass or less, still more preferably 45% by mass or less. When it is 60% by mass or less, particularly handling stability can be further improved.

The polybutadiene rubber (BR) is not particularly limited. Examples include those commonly used in the tire industry, such as high-cis polybutadiene rubbers, e.g. BR1220 available from Zeon Corporation and BR130B and BR150B both available from Ube Industries, Ltd.; modified polybutadiene rubbers, e.g. BR1250H available from Zeon Corporation; polybutadiene rubbers containing syndiotactic polybutadiene crystals, e.g. VCR412 and VCR617 both available from Ube Industries, Ltd.; and polybutadiene rubbers synthesized using rare earth catalysts, e.g. BUNA-CB25 available from Lanxess. These types of BR may be used alone, or two or more of these may be used in combination.

The BR preferably has a cis content of 70% by mass or more, more preferably 90% by mass or more, still more preferably 97% by mass or more.

The cis content (cis 1,4-linkage content) of BR as used herein can be measured by infrared absorption spectrometry.

In cases where the rubber composition for tires of the present invention contains polybutadiene rubber as an additional rubber which is not derived from the masterbatch, the amount of polybutadiene rubber based on 100% by mass of the rubber component in the rubber composition for tires of the present invention is preferably 5% by mass or more, more preferably 10% by mass or more, still more preferably 20% by mass or more. When it is 5% by mass or more, particularly excellent tensile strength can be obtained. The amount of polybutadiene rubber is also preferably 50% by mass or less, more preferably 40% by mass or less, still more preferably 30% by mass or less. When it is 50% by mass or less, particularly processability and fuel economy can be further improved.

In the rubber composition for tires of the present invention, the amount of the filler per 100 parts by mass of the rubber component is preferably 1 part by mass or more, more preferably 2 parts by mass or more, still more preferably 3 parts by mass or more, but is preferably 50 parts by mass or less, more preferably 30 parts by mass or less, still more preferably 20 parts by mass or less, particularly preferably 10 parts by mass or less. When it is 1 part by mass or more, the effects of the present invention can be more suitably achieved. When it is 50 parts by mass or less, the dispersibility of the filler can be further enhanced so that the effects of the present invention can be more suitably achieved.

The rubber composition for tires of the present invention may appropriately contain, in addition to the masterbatch, rubbers commonly used in the tire industry other than the rubber in the masterbatch, fillers (e.g. carbon black) commonly used in the tire industry other than the filler in the masterbatch, and various materials commonly used in the tire industry, such as silane coupling agents, zinc oxide, stearic acid, antioxidants, softeners, sulfur, and vulcanization accelerators.

In particular, the incorporation of carbon black into the rubber composition for tires provides a reinforcing effect. In addition, due to its combination with the filler, the dispersibility of the filler in the rubber composition for tires can be synergistically and significantly enhanced. Thus, in another suitable embodiment of the present invention, the rubber composition for tires contains carbon black.

Non-limiting examples of the carbon black include GPF, FEF, HAF, ISAF, and SAF. These types of carbon black may be used alone, or two or more of these may be used in combination.

The carbon black preferably has a nitrogen adsorption specific surface area ($N_2SA$) of 20 $m^2/g$ or more, more preferably 25 $m^2/g$ or more. The $N_2SA$ is also preferably 200 $m^2/g$ or less, more preferably 150 $m^2/g$ or less, still more preferably 120 $m^2/g$ or less. Carbon black having a $N_2SA$ of 20 $m^2/g$ or more can produce a higher reinforcing effect. Carbon black having a $N_2SA$ of 200 $m^2/g$ or less can further improve fuel economy.

Herein, the nitrogen adsorption specific surface area of carbon black can be determined in accordance with method A in JIS K 6217.

The amount of carbon black per 100 parts by mass of the rubber component is preferably 5 parts by mass or more, more preferably 10 parts by mass or more, but is preferably 200 parts by mass or less, more preferably 150 parts by mass or less, still more preferably 100 parts by mass or less, particularly preferably 70 parts by mass or less. When it is within the above range, better fuel economy can be obtained.

The rubber composition for tires can be prepared by known methods. For example, it may be prepared by kneading the masterbatch and various materials as described above using a rubber kneading machine such as an open roll mill or Banbury mixer, and vulcanizing the mixture.

[Pneumatic Tire]

The rubber composition for tires of the present invention can be suitably used in pneumatic tires. The pneumatic tire can be formed from the rubber composition for tires by usual methods. Specifically, the unvulcanized rubber composition for tires containing various materials as needed is extruded into the shape of a tire component and then formed in a usual manner on a tire building machine to build an unvulcanized tire. The unvulcanized tire is heated and pressurized in a vulcanizer, whereby a tire can be produced.

EXAMPLES

The present invention will be specifically described with reference to, but not limited to, examples.

The chemicals used in the examples and comparative examples are listed below.

Natural rubber latex: Hytex Latex (high ammonia type, solids concentration: 60% by mass) available from Nomura Trading Co., Ltd.

Microfibrillated natural fiber: biomass nanofiber (product name: BiNFi-s chitin, chitin nanofiber, solids content: 2% by mass, moisture content: 98% by mass, average fiber diameter: 10 to 50 nm, degree of polymerization: 300, specific surface area: 200 $m^2/g$) available from Sugino Machine Limited Natural rubber: TSR20

Polybutadiene rubber: BR150B (cis content: 97% by mass, $ML_{1+4}$ (100° C.): 40) available from Ube Industries, Ltd.

Carbon black: SHOBLACK N550 ($N_2SA$: 42 $m^2/g$) available from Cabot Japan K.K.

Antioxidant: NOCRAC 6C (N-phenyl-N'-(1,3-dimethylbutyl)-p-phenylenediamine) (6PPD) available from Ouchi Shinko Chemical Industrial Co., Ltd.

Zinc oxide: zinc oxide #2 available from Mitsui Mining & Smelting Co., Ltd.

Stearic acid: stearic acid beads "Tsubaki" available from NOF Corporation

Sulfur: Seimi Sulfur (oil content: 10%) available from Nippon Kanryu Industry Co., Ltd.

Vulcanization accelerator: NOCCELER NS (N-tert-butyl-2-benzothiazolesulfenamide) (TBBS) available from Ouchi Shinko Chemical Industrial Co., Ltd.

<Preparation of Masterbatch>

Example 1

An amount of 1,000 g of pure water was added to 500 g of the microfibrillated natural fiber to obtain a 0.5% by mass (solids concentration) suspension of the microfibrillated natural fiber. The suspension was stirred for about five minutes using a high-speed homogenizer ("T50" available from IKA Japan, rotational speed: 8,000 rpm) to give a homogeneous aqueous dispersion (viscosity: 7 to 8 mPa·s).

The solids concentration (DRC) of the natural rubber latex was adjusted to 10% by mass, and then the aqueous dispersion prepared as above was added to the natural rubber latex such that the dry weight (solids content) of the microfibrillated natural fiber was 20 parts by mass per 100 parts by mass of the rubber solids in the natural rubber latex, followed by stirring and mixing at 25° C. for five minutes using a high-speed homogenizer ("T50" available from IKA Japan, rotational speed: 8,000 rpm) to obtain a rubber latex dispersion. Next, a 1% by mass formic acid aqueous solution was added to the rubber latex dispersion with slow stirring at 25° C. for five minutes using an Eurostar (electronically controlled stirring device) (available from IKA Japan, rotational speed: 100 rpm) to adjust the zeta potential to –20 mV, thereby obtaining a latex compound as a coagulum. The coagulum was filtered and dried at 80° C. for six hours to obtain masterbatch 1.

The zeta potential was measured using the device under the conditions described below.

Measurement device: zeta potential analyzer "ELS-PT" available from Otsuka Electronics Co., Ltd.

Measurement Conditions

A pH titrator was used.

pH titration mode

Solvent: water

Temperature: 25° C.

Dielectric constant: 78.22

Viscosity: 0.8663 cp

Refractive index: 1.3312

The zeta potentials of the natural rubber latex (solids concentration: 10% by mass) and the aqueous dispersion of the microfibrillated natural fiber (solids concentration: 0.5% by mass) measured as above were as follows.

Natural rubber latex (solids concentration: 10% by mass): –65 mV

Aqueous dispersion of microfibrillated natural fiber (solids concentration: 0.5% by mass): 35 mV The dispersibility of the microfibrillated natural fiber in the rubber in masterbatch 1 was observed with a scanning electron microscope (SEM), and it was confirmed that the microfibrillated natural fiber formed no aggregate and was finely dispersed in the rubber.

Example 2

Masterbatch 2 was prepared as in Example 1, except that a 1% by mass formic acid aqueous solution was added to the rubber latex dispersion with slow stirring at 25° C. for five minutes using an Eurostar (available from IKA Japan, rotational speed: 100 rpm) to adjust the zeta potential to –10 mV, thereby obtaining a latex compound as a coagulum.

The dispersibility of the microfibrillated natural fiber in the rubber in masterbatch 2 was observed with a scanning electron microscope (SEM), and it was confirmed that the microfibrillated natural fiber formed no aggregate and was finely dispersed in the rubber.

Comparative Example 1

An amount of 1,000 g of pure water was added to 500 g of the microfibrillated natural fiber to obtain a 0.5% by mass (solids concentration) suspension of the microfibrillated natural fiber. The suspension was stirred for about five minutes using a high-speed homogenizer ("T50" available from IKA Japan, rotational speed: 8,000 rpm) to give a homogeneous aqueous dispersion (viscosity: 7 to 8 mPa·s). The solids concentration (DRC) of the natural rubber latex was adjusted to 10% by mass, and then the aqueous dispersion prepared as above was added to the natural rubber latex such that the dry weight (solids content) of the microfibrillated natural fiber was 20 parts by mass per 100 parts by mass of the solids in the natural rubber latex, followed by stirring and mixing at 25° C. for about five minutes using a high-speed homogenizer ("T50" available from IKA Japan, rotational speed: 8,000 rpm) to obtain a rubber latex dispersion. Next, a 1% by mass formic acid aqueous solution was added to the rubber latex dispersion with slow stirring at 25° C. for five minutes using an Eurostar (available from IKA Japan, rotational speed: 100 rpm) to adjust the pH to 7 using a pH meter D51T (available from Horiba, Ltd.), thereby obtaining a latex compound as a coagulum (the zeta potential was also measured as in Example 1 and found to be −29 mV). The coagulum was filtered and dried at 80° C. for six hours to obtain comparative masterbatch 1.

The dispersibility of the microfibrillated natural fiber in the rubber in comparative masterbatch 1 was observed with a scanning electron microscope (SEM), and it was confirmed that the microfibrillated natural fiber formed slight aggregates and was not sufficiently finely dispersed in the rubber.

Comparative Example 2

Comparative masterbatch 2 was prepared as in Example 1, except that a 1% by mass formic acid aqueous solution was added to the rubber latex dispersion with slow stirring at 25° C. for five minutes using an Eurostar (available from IKA Japan, rotational speed: 100 rpm) to adjust the zeta potential to −30 mV, thereby obtaining a coagulum.

The dispersibility of the microfibrillated natural fiber in the rubber in comparative masterbatch 2 was observed with a scanning electron microscope (SEM), and it was confirmed that the microfibrillated natural fiber formed aggregates and was not finely dispersed in the rubber.

Comparative Example 3

Comparative masterbatch 3 was prepared as in Example 1, except that a 1% by mass formic acid aqueous solution was added to the rubber latex dispersion with slow stirring at 25° C. for five minutes using an Eurostar (available from IKA Japan, rotational speed: 100 rpm) to adjust the zeta potential to 20 mV, thereby obtaining a coagulum.

The dispersibility of the microfibrillated natural fiber in the rubber in comparative masterbatch 3 was observed with a scanning electron microscope (SEM), and it was confirmed that the microfibrillated natural fiber formed aggregates and was not finely dispersed in the rubber.

<Preparation of Vulcanized Rubber Composition>

Examples 11 and 12, and Comparative Examples 11 to 13

According to each of the formulations shown in Table 1, the chemicals other than the sulfur and the vulcanization accelerator were kneaded using a 1.7 L Banbury mixer. Next, the sulfur and the vulcanization accelerator were added to the kneaded mixture and kneaded together using an open roll mill to obtain an unvulcanized rubber composition. The unvulcanized rubber composition was press-vulcanized at 170° C. for 15 minutes to obtain a vulcanized rubber composition. The vulcanized rubber compositions prepared as above were evaluated as described below. Table 1 shows the results.

(Tensile Test)

A tensile test was performed using No. 3 dumbbell-shaped rubber specimens prepared from the vulcanized rubber compositions in accordance with JIS K 6251 "Rubber, vulcanized or thermoplastics—Determination of tensile stress-strain properties" to determine the tensile strength at break (tensile strength: TB (MPa)) of the vulcanized rubber compositions.

The TB of each formulation example is expressed as an index (tensile strength index (TB index)) using the equation below, with Comparative Example 11 set equal to 100. A higher TB index indicates a higher tensile strength and better durability.

$$(TB\ index) = (TB\ of\ each\ formulation\ example)/(TB\ of\ Comparative\ Example\ 11) \times 100$$

(Viscoelastic Test)

The complex modulus E* (MPa) and loss tangent (tan δ) in the tire circumferential direction of specimens cut out of the formulation examples (vulcanized rubber compositions) were measured using a viscoelastic spectrometer VES (available from Iwamoto Seisakusho Co., Ltd.) at a temperature of 70° C., a frequency of 10 Hz, an initial strain of 10%, and a dynamic strain of 2%.

The E* and tan δ of each formulation example are expressed as indices (E* index, tan δ index) using the equations below, each with Comparative Example 11 set equal to 100. A higher E* index indicates higher rigidity and better handling stability. A higher tan δ index indicates better rolling resistance properties (fuel economy).

$$(E^*\ index) = (E^*\ of\ each\ formulation\ example)/(E^*\ of\ Comparative\ Example\ 11) \times 100$$

$$(\tan\ \delta\ index) = (\tan\ \delta\ of\ Comparative\ Example\ 11)/(\tan\ \delta\ of\ each\ formulation\ example) \times 100$$

The term "tire circumferential direction" means the direction along which the vulcanized rubber composition was extruded.

(Balance Index)

An index of the balance of tire properties was calculated from the above indices using the equation below. A higher balance index indicates a better balance of tensile strength, rigidity, and fuel economy.

$$(Balance\ index) = (TB\ index \times E^*\ index \times \tan\ \delta\ index)/10{,}000$$

TABLE 1

|  |  | Comparative Example 11 | Example 11 | Example 12 | Comparative Example 12 | Comparative Example 13 |
|---|---|---|---|---|---|---|
| Formulation (parts by mass) | Masterbatch | Comparative Masterbatch 1 (Comparative Example 1) | Masterbatch 1 (Example 1) | Masterbatch 2 (Example 2) | Comparative Masterbatch 2 (Comparative Example 2) | Comparative Masterbatch 3 (Comparative Example 3) |
|  | (Natural rubber solids: 100 parts by mass) (Microfibrillated natural fiber: 20 parts by mass) | 30 | 30 | 30 | 30 | 30 |
|  | Adjusted zeta potential [mV] | −29 | −20 | −10 | −30 | 20 |
|  | Natural rubber | 45 | 45 | 45 | 45 | 45 |
|  | Polybutadiene rubber | 30 | 30 | 30 | 30 | 30 |
|  | Carbon black | 40 | 40 | 40 | 40 | 40 |
|  | Antioxidant | 2 | 2 | 2 | 2 | 2 |
|  | Zinc oxide | 2 | 2 | 2 | 2 | 2 |
|  | Stearic acid | 2 | 2 | 2 | 2 | 2 |
|  | Sulfur | 2 | 2 | 2 | 2 | 2 |
|  | Vulcanization accelerator | 1 | 1 | 1 | 1 | 1 |
| Evaluation | TB index | 100 | 109 | 110 | 99 | 95 |
|  | E* index | 100 | 105 | 104 | 100 | 97 |
|  | tanδ index | 100 | 120 | 118 | 99 | 96 |
|  | Balance index | 100 | 137 | 135 | 98 | 88 |

Table 1 demonstrates that the balance of tensile strength, rigidity, and fuel economy was improved in Examples 11 and 12 each using a masterbatch produced by a method including a step of mixing a rubber latex having a zeta potential of −100 to −20 mV with a filler dispersion having a zeta potential of 10 to 90 mV, and preparing a latex compound having a zeta potential of −20 to 0 mV, as compared to Comparative Example 11. In contrast, the balance of tensile strength, rigidity, and fuel economy was found to deteriorate in Comparative Examples 12 and 13 each using a masterbatch produced by adjusting the zeta potential of the latex compound to a value outside the range of −20 to 0 mV.

The invention claimed is:

1. A method for producing a masterbatch, the method comprising a step of mixing a rubber latex having a zeta potential of −100 to −20 mV with a filler dispersion having a zeta potential of 10 to 90 mV, and preparing a latex compound having a zeta potential of −20 to 0 mV, wherein the filler is a microfibrillated natural fiber.

2. The method for producing a masterbatch according to claim 1, wherein the rubber latex is a diene rubber latex.

3. A masterbatch, produced by the method according to claim 1.

4. A rubber composition for tires, produced from the masterbatch according to claim 3.

5. A pneumatic tire, formed from the rubber composition according to claim 4.

6. A pneumatic tire, formed from a rubber composition which is produced from a masterbatch which is produced by the method according to claim 2.

* * * * *